United States Patent [19]

Hairgrove, Sr.

[11] 4,093,845
[45] June 6, 1978

[54] CONTROLLER FOR DC ARC WELDING GENERATORS

[76] Inventor: Nelson Hairgrove, Sr., 5411 Northington, Houston, Tex. 77039

[21] Appl. No.: 761,580

[22] Filed: Jan. 24, 1977

Related U.S. Application Data

[63] Continuation-in-part of Ser. No. 588,200 Jun. 19, 1975, abandoned.

[51] Int. Cl.² .............................................. B23K 9/10
[52] U.S. Cl. .................................. 219/132; 219/133; 290/30 R
[58] Field of Search .............. 219/132, 133; 290/38 C, 290/DIG. 5, DIG. 8, 30 R

[56] References Cited

U.S. PATENT DOCUMENTS

| | | | |
|---|---|---|---|
| 1,875,192 | 8/1932 | Middleton | 290/DIG. 5 |
| 2,043,331 | 6/1963 | Notvest | 219/132 |
| 2,135,046 | 11/1938 | Blankenbuehler | 290/30 R |
| 2,804,553 | 8/1957 | McFarland | 219/133 |
| 2,916,634 | 12/1959 | McFarland | 290/30 R |

Primary Examiner—J. V. Truhe
Assistant Examiner—Clifford C. Shaw
Attorney, Agent, or Firm—Michael P. Breston

[57] ABSTRACT

The controller automatically and remotely controls the stopping and running of an internal combustion engine coupled to a DC generator that supplies DC power to the welding cables of an arc welding machine. The engine has a starter, an ignition, and an intake manifold. A vacuum-actuated switching means is coupled to the intake manifold and is responsive to the vacuum produced therein. A switching circuit is coupled to and is controlled by the vacuum-actuated switching means. A starter and an ignition are coupled to the switching circuit. A timer having a predetermined timing interval is coupled to the switching circuit, to the welding circuit, and to the ignition.

10 Claims, 5 Drawing Figures

CONTROLLER FOR DC ARC WELDING GENERATORS

REFERENCE TO RELATED APPLICATION

This application is a continuation-in-part of my copending application Ser. No. 588,200 filed June 19, 1975, and now abandoned.

BACKGROUND OF THE INVENTION (a) Field of the Invention

This invention relates to the control of DC generators used in arc welding operations, the generators being driven by internal combustion engines.

(b) Description of the Prior Art

In U.S. Pat. No. 2,135,046 issued on Nov. 1, 1938 is described a controller for a motor-generator arc welding set. This patent describes a motor powered by a three-phase electric main. The motor drives an A/C generator which supplies current to an arc welder circuit. A saturable transformer 65 has a primary winding 66 connected in series circuit relation with the welding cable and a secondary winding 64 connected in series with the coil of a relay which controls the main switch of the three phase main. The relay has a pair of contacts which are coupled to a timer 35 for the purpose of disconnecting the motor from the main after a predetermined interval of time following the cessation of welding operations.

In many arc welding machines, especially those used in the construction field wherein no electric energy is readily available, DC generators are used which are driven by internal combustion engines.

The problems associated with controlling a DC generator of a welding machine driven by an internal combustion engine are totally different from those encountered in connection with controlling an A/C generator driven by an A/C motor. In fact, the problems were compounded by the fact that the running or stopping of an internal combustion engine does not, in and by itself, produce an electric phenomenon which can be electrically monitored.

Also, the very high surge currents resulting from switching a DC welding generator into a short circuit condition discouraged workers in the art from developing a controller for DC arc welding machines, since the switching mechanism received in the welding circuit to implement the remote starting function becomes very easily damaged when such surge currents are allowed to flow during the switch closure. For these and other well-known reasons, no practical controller for remotely controlling the DC generator of an arc welder driven by an internal combustion engine has been introduced on the market, even though there is a great and pressing need for such a controller, especially since almost 40 years ago said U.S. Pat. No. 2,135,046 had described certain desirable features which such a controller might possess.

The present invention provides what is believed to be by applicants, the first practical, reliable and relatively inexpensive controller for arc welding machines whose DC generators are driven by internal combustion engines. This invention couples a vacuum-actuated device to the intake manifold of the engine for the purpose of carrying out switching operations. Also, applicants have discovered practical means for protecting the controller from the surge currents in the welding circuit.

SUMMARY OF THE INVENTION

The controller automatically and remotely controls the stopping and running of an internal combustion engine coupled to a DC generator that supplies DC power to the welding cables of an arc welding machine. The engine has a starter, an ignition, and an intake manifold. A welding circuit includes the DC generator, a DC power source for providing a control current, and a current-blocking device for blocking the control current from the generator. A vacuum-actuated switching means is coupled to the intake manifold and is responsive to the vacuum produced therein. A switching circuit is coupled to and controlled by the vacuum-actuated switching means. A starter is coupled to the switching circuit. An ignition is coupled to the switching circuit. A timer having a predetermined timing interval is coupled (1) to the switching circuit, (2) to the welding circuit, and (3) to the ignition. The switching circuit, upon establishing continuity between the cables for the control current, energizes the ignition and the starter, thereby enabling the starting of the engine. The timer stops the engine when no welding current flows through the welding cables during the timing interval of the timer.

GENERAL DESCRIPTION OF CONTROLLER 25

Figure 1:
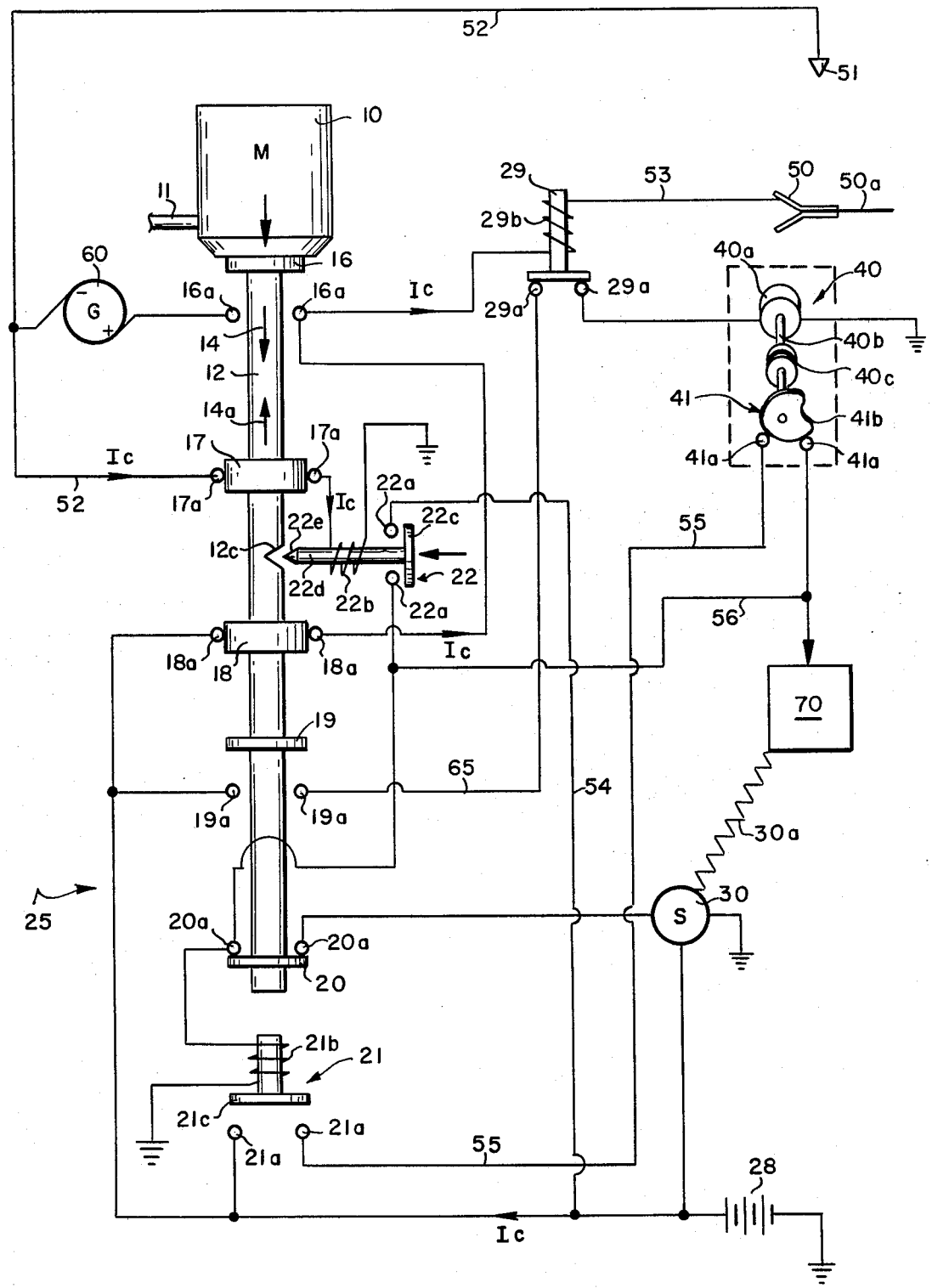
FIG. 1 is a diagrammatic representation of an electromechanical embodiment of the controller of the present invention.

Referring now to FIG. 1, the controller, generally designated as 25, is illustrated in the position which it assumes when the internal combustion engine 70 is not running. The manifold (not shown) of engine 70 is coupled through a vacuum line 11 to a motor 10 which is spring loaded, and constructed in a manner well known in the art, so as to tend to urge its shaft 12 inwardly in the direction 14a to the position as shown in FIG. 1, when engine 70 stops running and no vacuum exists in line 11. But, when engine 70 is running, the vacuum in line 11 causes motor 10 to move shaft 12 longitudinally away from the motor in the direction 14.

Shaft 12 carries thereon a plurality of longitudinally spaced-apart switch members 16–20 having switch contacts 16a–20a, respectively.

Mechanically coupled to shaft 12 is shaft 22d of switch 22. A DC power source 28 energizes the controller 25 as well as the starter 30 which is coupled, as represented by 30a, to the crank shaft of engine 70.

A timer 40 is provided for controlling a cam-operated switch 41. Timer 40 comprises a motor 40a having a shaft 40b for driving the cam-operated switch 41 having terminals 41a. When motor 40a is not energized the contacts 41a are normally closed. When motor 40a is energized it rotates cam 41b for a predetermined timing interval To until the eccentric portion is opposite terminals 41a and switch 41 opens. Another solenoid-operated switch 29 has its coil 29b in series with the welding cable 53 whose welding electrode 50 holds the welding rod 50a. Engine 70 mechanically drives a D-C generator 60 which produces the welding current for rod 50a.

Timer 40 automatically stops engine 70 after it has run a preset time interval after the last welding operation. After engine 70 is stopped or when it is not running, no vacuum is present in conduit 11 and the internal spring arrangement in motor 10 moves shaft 12 inwardly (14a) to the position as representation in FIG. 1. This is the "armed" position of controller 25 from which the engine can be made to start from the welder's normal operating position, merely by contacting the grounded work piece or ground 51 with the welding rod 50a.

After engine 70 has started, the welder momentarily breaks contact with the ground or the work piece which has the effect of deactivating solenoid 22 and a portion of the controller's circuitry. Engine 70 will then continue to run until it is shut off by timer 40. While engine 70 is running, generator 60 supplies current to the arc welding electrode 50, and battery 28 supplies current to the ignition of the engine.

DETAILED DESCRIPTION OF THE CONTROLLER 25

When engine 70 is not running, shaft 12 is in its position as shown in FIG. 1, switches, 17, 18, 20, 29 and 41 are closed ("ON") and switches 16, 19, 21 and 22 are open ("OFF").

Upon contacting the grounded work piece or ground 51 with electrode 50 or rod 50a, control current Ic starts flowing from battery 28 through switch 18, coil 29b, electrode cables 52, 53, switch 17, coil 22b and back to the other terminal of the battery which is grounded. However, this current is insufficient to activate switch 29 and to open contacts 29a, but it is sufficient to activate switch 22 and to connect terminals 22a with switch member 22c.

The tip end 22e or rod 22d engages notch 12c in the motor shaft 12. This engagement serves as a latch for the circuitry as will be subsequently described.

Current can now flow from battery 28 through line 54, contacts 22a, contacts 20a, and into starter 30. Line 54 also feeds current into coil 21b, thereby closing contacts 21a. Battery current can now flow into line 55, contacts 41a, and into the ignition of engine 70.

Since both the starter and the ignition are energized, the engine is enabled to start. If the engine does start, a vacuum is created in conduit 11, causing shaft 12 to move away from motor 10 in the direction 14. There is sufficient clearance between the tip end 22e of shaft 22d and notch 12c on shaft 12 to allow shaft 12 to move downwardly, but only by an amount sufficient to cause the opening of switch contacts 20a, thereby removing the flow of current into starter 30. Shaft 12 does not move sufficiently to open switch contacts 17a and 18a or to close contacts 16a, for as long as welding rod 50a contacts ground 51 when engine 70 is initially started.

But by momentarily disengaging rod 50a from ground 51, the flow of current through coil 22b is interrupted, causing the disengagement between rod 22 and shaft 12, and allowing motor 10 to fully move shaft 12 in the direction 14 until contacts 16a and 19a close and contacts 17a and 18a open. Current can now flow from generator 60, driven by engine 70, through coil 29b into electrode 50.

The restraining action of rod 22 upon shaft 12, while the DC generator 60 is running and rod 50a and ground 51 are touching, imposes a condition whereby the rod 50a and ground 51 connection must be interrupted in order to permit shaft 12 to close contacts 16a. This condition prevents the closure of contacts 16a when the DC generator is running and a short circuit welding load condition exists, i.e., rod 50a is connected to ground 51. This prevents destruction of the switch contacts 16a due to arcing by the resulting short circuit surge currents which would result if said condition were not met.

Line 56 also supplies current to coil 21b to close contacts 21a, thereby latching relay 21. Ignition current can now be directly supplied from the battery through the contacts 21a and 41a to keep engine 70 running even after switch contacts 22a open to de-energize starter 30.

Whereas the control current Ic flowing through coil 29b was insufficient to open contacts 29a, when welding current also starts flowing from generator 60 through coil 29b, contacts 29a open thereby removing the power to motor 40a. A spring loaded-mechanism 40c then returns the cam to its zero position, as shown in FIG. 1.

When welding operations are interrupted, contacts 29a reclose and timer 40 starts running.

If welding operations are resumed during the timing interval of timer 40 while it is running, it will again reset to zero because welding current will flow from generator 60 through coil 29b resulting in the opening of contacts 29a.

If no welding current is used for a longer than the preset timing interval, the timer opens contacts 41a, thereby removing the flow of ignition current and stopping engine 70.

GENERAL DESCRIPTION OF CONTROLLER 71

The general description will be given in connection with FIG. 2 and the timing diagram of FIG. 3.

In the electronic controller 71, to the extent possible the same numerals will be used to designate the same or similar parts as were used in controller 25.

Network 71 comprises a welding circuit 72 which is coupled through a start control line 73 with a switching circuit 74, and through a timer control line 75 with a timer circuit 76. A vacuum-actuated switch 77 is coupled with timer circuit 76 through an enable line 78 and with switching circuit 74 through an enable line 79.

Engine 70 has an ignition system 70a, a starter 30, and an intake manifold 70b. Conduit 11 couples the intake manifold with switch 77. A logic circuit 80 is coupled with switching circuit 74 through a starter enable line 81 and a latch line 82. Line 81 is also connected to a starter circuit 83. Logic circuit 80 is connected to starter circuit 83 through a starter control line 81a.

A power circuit 84 provides the D-C power required for the energization of the various circuits in controller 71 and of engine 70.

The switching circuit 74 and timer circuit 76 are both connected through an enable line 85 to an ignition circuit 86.

Engine 70 can be started remotely from the welder's normal working position by simply making, at time t1, a momentary contact between the welding rod 50a and the grounded work piece or ground 51. This momentary touching generates a start command signal applied to switching circuit 74 through line 73, which initiates the engine starting sequence. The switching circuit is normally enabled through line 79.

The switching circuit 74 becomes energized at t1 and enables the ignition circuit 86 through line 85 which has the effect of energizing the engine's ignition at time t1 through line 86a. The logic circuit 80 produces an initial delay T1 during which the circuits are properly conditioned.

After the initial delay T1 at t2, logic circuit 80 produces a second delay T2. At t2 logic circuit 80 energizes the starter circuit 83 which supplies power to starter 30 through line 83a.

If the engine starts at t3, a vacuum will be established in conduit 11, thereby actuating vacuum switch 77 which enables timer circuit 76 through line 78. When the engine starts, the second time delay T2 ends at t3, and the switching circuit 74 de-energizes the starter circuit 83 through line 81 and hence starter 30. The timer circuit starts running at t3 for a predetermined timing interval To.

If no welding current is used, then at the end of To at t5, timer circuit 76 will through line 85 disable the ignition circuit 86 which will remove the ignition current from the ignition 70a. On the other hand, if the welding circuit 72 detects the flow of welding current through cable 53 at t4 during To, it will produce an output signal on line 75 which will reset the timer. The timer will remain reset and will start running only upon the completion of the welding operation at t6.

Thus, after the engine is initially started, the switching circuit and hence the controller 71 is in a quiescent state for as long as welding current is used by the welder. Cessation of welding current starts the timer circuit which has the capability of shutting down engine 70 at t5, i.e., at the end of the timing interval To, if no welding operation is resumed prior thereto.

If engine 70 failed to start during delay T2, logic circuit 80 de-energizes starter circuit 83 and removes power from starter 30 at time t3a.

DETAILED DESCRIPTION OF CONTROLLER 71

Figure 2:
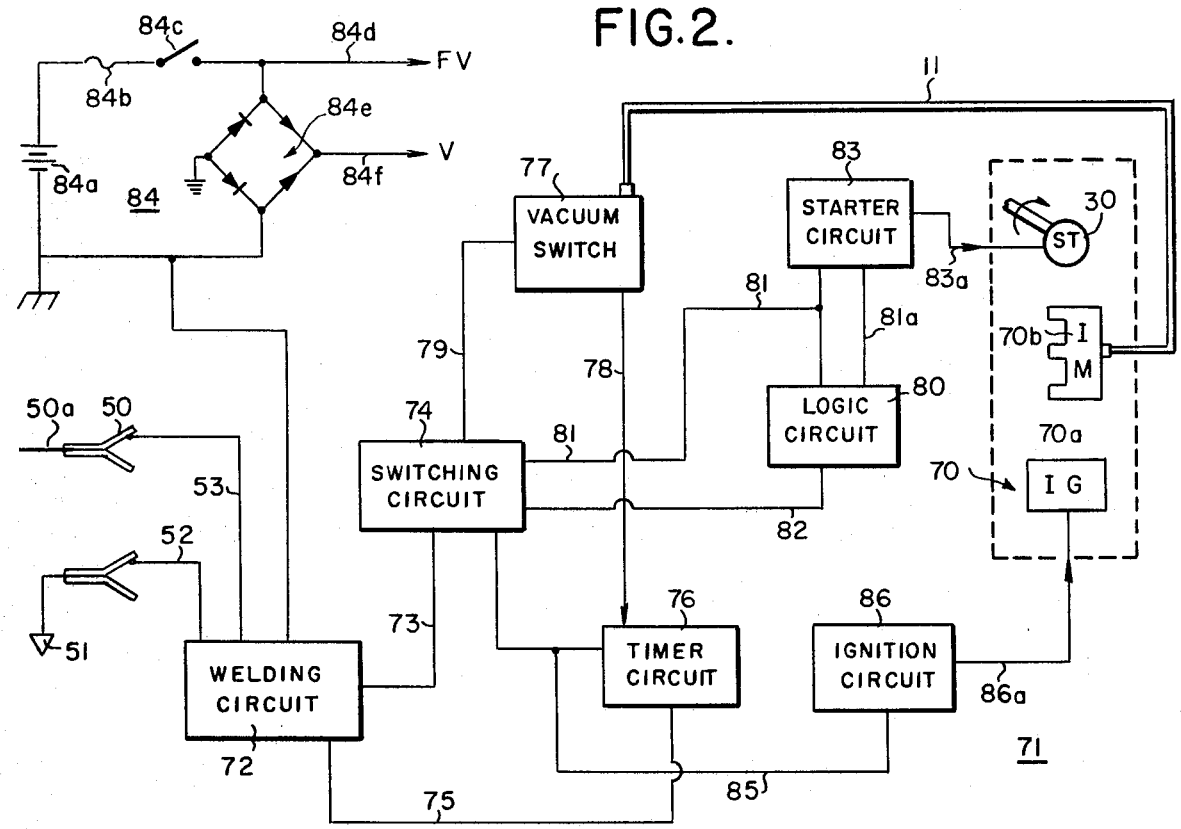
FIG. 2 is a block diagram representation of an electronic controller of the present invention.
Figure 3:
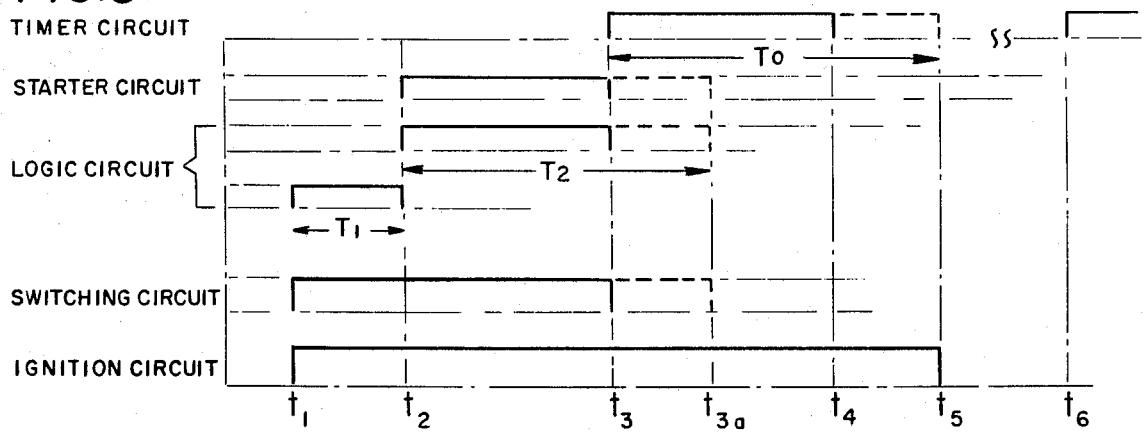
FIG. 3 is a timing diagram helpful in understanding the operation of the controller shown in FIG. 2.
Figure 4:
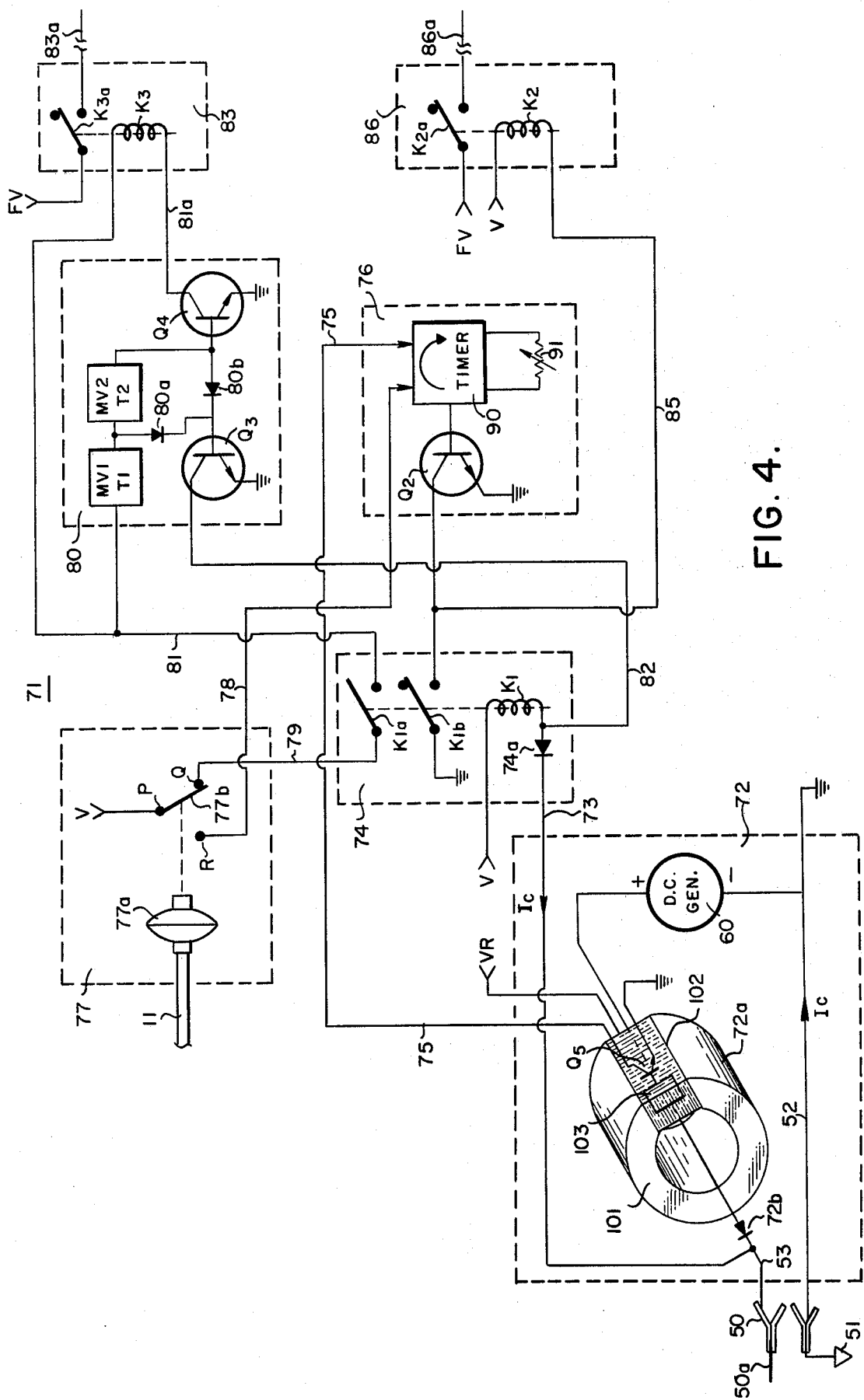
FIG. 4 is a circuit diagram of the controller shown in FIG. 2.

With reference now to FIGS. 2–4, the welding circuit 72 comprises a D-C generator 60 which is mechanically coupled to and driven by the internal combustion engine 70.

Sensing the welding current flow in the electrode cable 53 is a current sensor device 72a and a blocking diode 72b which protects the windings of generator 60.

The power circuit 84 (FIG. 2) comprises a battery 84a, a fuse 84b, a manually-operated switch 84c which provides fused battery voltage (FV) to line 84d. A rectifier bridge circuit 84e provides a positive voltage V on line 84f. The diode bridge 84e makes the controller 71 accept battery voltage of either polarity.

The switching circuit 74 includes a relay K1 having normally-open switches K1a and K1b and a blocking diode 74a.

The ignition circuit 86 comprises a relay K2 having a normally-open switch K2a.

The logic circuit 80 comprises a transistor Q3, a multi-vibrator MV1, a multi-vibrator MV2, a transistor Q4, and a pair of diodes 80a and 80b, polarized as shown.

The starter circuit 83 comprises a relay K3 having a normally open switch K3a.

The timer circuit 76 comprises a transistor Q2 coupled to an electronic timer 90 having a time-setting rheostat 91.

In operation, by momentarily contacting at time t1 rod 50a with the grounded work piece or ground 51, control current Ic will flow through relay K1 which closes switches K1a and K1b. Battery current now starts flowing at t1 into multi-vibrator MV1, which produces a pulse T1 of say 1.5 seconds. This pulse turns ON transistor Q3 during T1 through diode 80a while diode 80b blocks transistor Q4. Transistor Q3 then acts as a closed switch to ground for relay K1, thereby latching relay K1 to ground and making it independent of welding electrode 50. The output pulse T1 of multi-vibrator MV1 also triggers, at t2, multi-vibrator MV2 which produces an output pulse T2 of say ten seconds.

Pulse T2 turns transistor Q4 ON at t2, and Q3 is maintained in the ON condition through diode 80b. When transistor Q4 is turned ON, relay K3 becomes energized, closing switch K3a. Battery current now flows through line 83a to energize starter 30.

The closure of switch K1b at t1, by the initial energization of relay K1, causes relay K2 to become energized and switch K2a closed. The battery starts feeding current at time t1 to the ignition 70a of engine 70 through line 86a.

When the ignition and starter are both energized at time t2, conditions exist for the engine to start. If the engine does start at t3, the vacuum generated in the intake manifold 70b operates on the diaphragm 77a which moves the switch 77b from terminals P-Q to terminals P-R, thereby enabling timer 90 through line 78 and de-energizing the starter circuit 83 by interrupting line 81.

When the ignition 70a of engine 70 is energized, the engine can continue to run for the entire duration of the timing interval To of the timer up to t5, say between 3 to 15 minutes as set by rheostat 91, or longer depending on the welding operations.

If welding current flows at any time during the timing interval To, say at t4, the current sensor 72a will produce an output signal on line 75 which resets timer 90 to zero. The timer will remain reset for the duration of the welding operation. Cessation of the welding operation re-starts the timer at time t6.

Once engine 70 has started, D-C generator 60 produces a voltage output in the expected manner. Switching circuit 74 is protected from said output by blocking diode 74a.

If engine 70 failed to start during delay T2, transistor Q4 turns OFF at t3a, relay K3 becomes de-energized via line 81a, opening switch K3a, and interrupting battery current to starter 30.

Thus, the controller 71 does not interfere with the continuous welding operation, but it does allow the welder from his normal operating position to remotely start the engine which will automatically shut down during periods of welding non-usage greater than the timing interval To selected by the welder.

It should be noted that the ignition circuit 86 may be modified to function with a magneto type ignition by converting K2a to a normally-closed configuration and connecting K2a to ground rather than to voltage source FV, as will be apparent to those skilled in the art.

The current sensor 72a has a toroidal-shaped, laminated core 101. A small gap 102 in the core contains a Hall-effect semiconductor device 103 which is coupled to a transistor Q5 producing an output on line 75 which is a function of the magnetic flux field density developed in core 101 by the flow of current in cable 53. Device 103 is switched ON when a field exists, and is switched OFF when no field exists in gap 102. The output of device 103 is connected to a transistor Q5.

Figure 5:
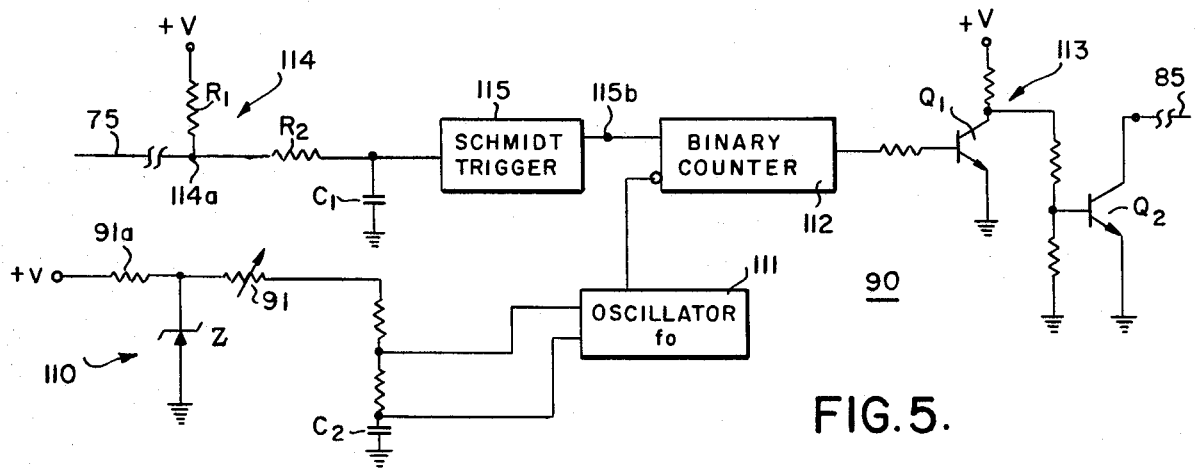
FIG. 5 is a diagrammatic representation of the timer used in the controller shown in FIG. 2.

With reference to FIG. 5, the timer 90 comprises a voltage regulator 110 (91a and Z), an oscillator 111 having an adjustable frequency $f_0$, a binary counter 112, output circuit 113, a filter network 114 (R1, R2 and C1), and a Schmidt trigger circuit 115.

The frequency $f_0$ of the oscillator is controlled by the rheostat 91 which works in conjunction with the timing circuit capacitor C2. The binary counter 112 will count a number, say 512, of oscillations. At the end of its count, the output of the binary counter goes "high" thereby turning transistor Q1, "ON" which turns transistor Q2 "OFF." Relay K2 (FIG. 4) becomes de-energized thereby removing the current from the ignition 70a and stopping engine 70. The output from transistor Q5 on line 75 is sensed by the Schmidt trigger circuit 115 whose output resets the binary counter 112.

The fluctuations of the welding current are such that without the filter network 114, the operation of the timer would be erratic. When no welding current is detected by the current sensor 72a, the output transistor Q5 is OFF thus allowing the battery current to charge capacitor C1 through resistors R1 and R2.

When welding current is detected by the current sensor 72a, transistor Q5 will turn ON, effectively grounding the input terminal 114a to the filter 114 and allowing capacitor C1 to discharge. After capacitor C1 sufficiently discharges, the output 115b of the Schmidt trigger circuit will go "high" thereby resetting the binary counter 112. The binary counter is now reset and will remain reset for as long as welding current flows. Cessation of welding current allows the counter to count the desired number of frequency oscillations produced by the oscillator.

A dual integrated circuit is commercially available and can function either as an oscillator 111 or a Schmidt circuit 115, depending upon the desired circuit configuration. Such a dual circuit can be purchased from Signetics, Sunnyvale, Calif.

What is claimed is:

1. A controller for remotely starting and automatically stopping an internal combustion engine coupled to a DC generator that supplies DC power to the welding cables of an arc welding circuit, the engine having a starter, an ignition, and an intake manifold, comprising in combination:
   a DC power source for providing a control current to said welding circuit, a current-blocking device for blocking said control current from said generator, and a current sensing device for sensing the flow of welding current,
   a vacuum-actuated switching means coupled to said intake manifold and being responsive to the vacuum produced therein,
   a switching circuit coupled to and controlled by said vacuum-actuated switching means,
   a starter coupled to said switching circuit,
   an ignition coupled to said switching circuit,
   a timer having a predetermined timing interval and being coupled (1) to said switching circuit, (2) to said welding circuit, and (3) to said ignition,
   said switching circuit, upon establishing continuity between said cables for said control current, energizing said ignition and said starter, thereby enabling the starting of said engine, and
   said timer stopping said engine if welding current does not flow through said cables at any time during the timing interval of said timer.

2. The controller of claim 1, wherein said vacuum-actuated switching means includes a vacuum-operated motor having a shaft which is spring-biased toward the motor, and tending to move outwardly in response to a vacuum in said intake manifold, and a relay responsive to said control current for energizing said ignition and for inhibiting the movement of said shaft.

3. The controller of claim 2, wherein the movement of said shaft is resumed upon the breaking of said continuity following the making of said continuity thereby applying a voltage to said electrodes for a welding operation.

4. The controller of claim 3, wherein said shaft carries a switch having normally open contacts in series with one of the welding cables.

5. A controller for remotely starting and automatically stopping an internal combustion engine coupled to a DC generator that supplies DC power to the welding electrodes of an arc welding circuit, the engine having a starter, an ignition, and an intake manifold, comprising in combination:
   a DC power source for providing a control current to said welding circuit, a current-blocking device for blocking said control current from said generator, and a current sensing means for sensing the flow of welding current,
   a vacuum-actuated switching means coupled to said intake manifold and being responsive to the vacuum produced therein,
   an ignition circuit energizing the ignition of said engine,
   a starter circuit energizing the starter of said engine,
   a switching circuit energized by said control current upon making of the welding electrodes,
   a timer circuit energized through said vacuum-actuated switching means and being controlled by the output of said sensing means,
   said ignition circuit being energized through said switching circuit and said timer circuit,
   a logic circuit being energized through said switching circuit,
   said starter circuit being energized through said switching circuit and said logic circuit, and said logic circuit during consecutive time delays T1 and T2 latching said switching circuit and energizing said ignition circuit, and during time delay T2 energizing said starter circuit, thereby enabling said engine to start,
   the starting of the engine creating a vacuum in said intake manifold which moves the vacuum-actuated switching means to de-energize said starter circuit and said logic circuit, and to energize said timer circuit for producing a timing interval, and
   said timer circuit de-energizing said ignition circuit thereby stopping the engine, if welding current is not sensed by the sensing means at any time during the timing interval.

6. The controller of claim 5 wherein said switching circuit includes a relay having normally-open contacts and a blocking diode in series with said relay.

7. The controller of claim 6 wherein said ignition circuit includes a relay having normally open contacts.

8. The controller of claim 7 wherein said logic circuit includes a pair of multi-vibrators connected in series.

9. The controller of claim 8 wherein the output of each multi-vibrator is connected to a transistor.

10. The controller of claim 9 wherein said timer circuit comprises an output transistor and an electronic timer coupled to the input of said transistor, the output of said transistor being connected to said switching means and to said ignition circuit.

* * * * *